United States Patent [19]
Jungle et al.

[11] 3,816,861

[45] June 18, 1974

[54] MEANS FOR GRINDING THE SURFACE OF WELDING SEAM INTERCONNECTING TWO TUBULAR MEMBERS

[75] Inventors: Nils Åke Curt Jungle; Nils Rune Janred, both of Goteborg, Sweden

[73] Assignee: Aktiebolaget Gotaverken, Goteborg, Sweden

[22] Filed: Sept. 26, 1972

[21] Appl. No.: 292,350

[30] Foreign Application Priority Data
Nov. 8, 1971 Sweden............................ 14200/71

[52] U.S. Cl.............................. 51/241 S, 51/241 B
[51] Int. Cl........................................... B24b 19/00
[58] Field of Search............ 51/241 S, 241 B, 241 G

[56] References Cited
UNITED STATES PATENTS
1,902,188   3/1933   Schmidt et al.................... 51/241 B
2,297,074   9/1942   Rohrdane......................... 51/241 B Primary Examiner—James L. Jones, Jr.
Attorney, Agent, or Firm—Pierce, Scheffler & Parker

[57] ABSTRACT

When interconnecting two concentrically arranged tubes, of which the inner one extends beyond the end of the outer one the welding seam will cover at least a substantial part of the end of the outer tube and then conically taper into the inner tube. When many such tube combinations are arranged in close relationship certain difficulties are encountered in grinding the surface of the individual welding seams, which is desirable out of consideration to the resistance to flow of a fluid passing outside the tubes and also for inspecting the quality of the welding seams.

The grinding is performed by means of an apparatus comprising a sleeve, upon which a grinding wheel and driving means for the same are mounted, the sleeve being carried by two rings releasably attached to the inner tube. The rings can be fixed in an arbitrary position along the tube and the sleeve is provided with means for adjusting the position of the grinding wheel axially as well as radially.

1 Claim, 2 Drawing Figures

PATENTED JUN 18 1974  3,816,861

MEANS FOR GRINDING THE SURFACE OF WELDING SEAM INTERCONNECTING TWO TUBULAR MEMBERS

BACKGROUND OF THE INVENTION

With heat exchangers and similar apparatus it sometimes happens that a tube must be mounted within another tube, for instance designed as a nipple extending from an end plate or the like, whereupon the two tubes are interconnected by means of an external welding seam, which covers at least a substantial part of the end of the heavier, outer tubular member and conically tapers towards the inner tubular member. This welding seam must be built-up by a number of superimposed smaller welding strands, which run around the tubes. On many occasions it is desirable, i.a. due to consideration of the resistance to flow and also to make possible an inspection of the joints between the individual welding strands, to grind the surface of the resulting welding seam. This is difficult to perform manually and in a heat exchanger the tubes are often mounted so close by each other that it is impossible to reach the seam with a complicated apparatus.

SUMMARY OF THE INVENTION

The present invention proposes a simple device which is easy to mount and to operate and by the aid of which welding seams of the type above described may be ground to the desired exactness. The invention is characterized in a guiding ring detachably mounted on the inner tubular member, a rotatable carrier resting on the guiding ring and concentrically arranged with respect to the tubular members, means mounted upon the carrier for driving a grinding wheel arranged in such a manner that it will work the full external face of the welding seam, and further means for adjusting the position of the driving means and thereby also the grinding wheel axially as well as radially with respect to the longitudinal axis of the tubular members.

SHORT DESCRIPTION OF THE DRAWING

FIG. 1 shows the device in working position, and
FIG. 2 shows a longitudinal section through the welding seam and parts of the apparatus.

DESCRIPTION OF THE PREFERRED EMBODIMENT

Figure 1:
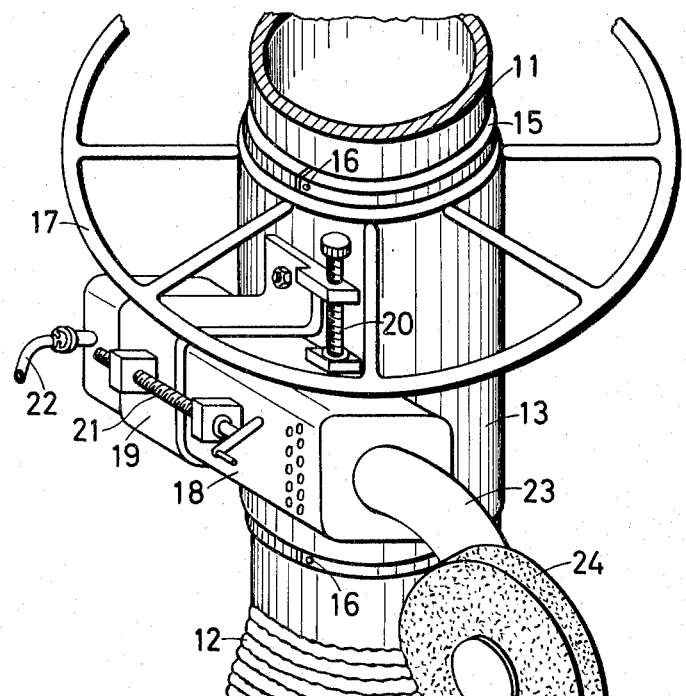

A number of nipples 10 are welded to a plate (not shown). A tube 11 is fitted into each of these nipples and connected thereto by means of a welding seam 12, built-up by a number of welding strands running around the tube. In this manner it is possible to obtain a solid joint, which will cover at least a substantial part of the end of the nipple 10 and conically tapers into the inner narrower tube 11. As shown on the left parts of both figures this welding joint will have a very rough and uneven external face, and it is desirable to provide a smooth shape in order to diminish the resistance to flow and also to make possible an inspection of the joints between the individual welding strands.

The device comprises a tubular carrier 13, which during work rests upon a lower guiding ring 14, the carrier at its upper end being guided by a second ring 15 of principally the same design as the guiding ring 14.

On occasions when it is possible to fit the apparatus on the inner tube 11 from above the carrier may be designed as a one-piece tubular unit whereas the guiding rings are formed as open, elastic members, which by means of suitable clamping devices, indicated at 16, may be forced together in such a manner that the rings, or at least the lower ring 14, may be retained in exact position above the welding joint.

If the upper end of tube 11 is attached to some other component, whereby it will be impossible to mount the apparatus directly on the tube, the carrier in the same manner as the rings must be designed in two halves, which are mounted upon the tube and are locked together when encircling the same.

The carrier is provided with a hand wheel 17 by means of which it may be manually turned around the tube as the work proceeds. Instead of manual operation any suitable type of mechanical operation may be used, on which occasion the hand wheel preferably is substituted by a gear wheel.

Figure 2:
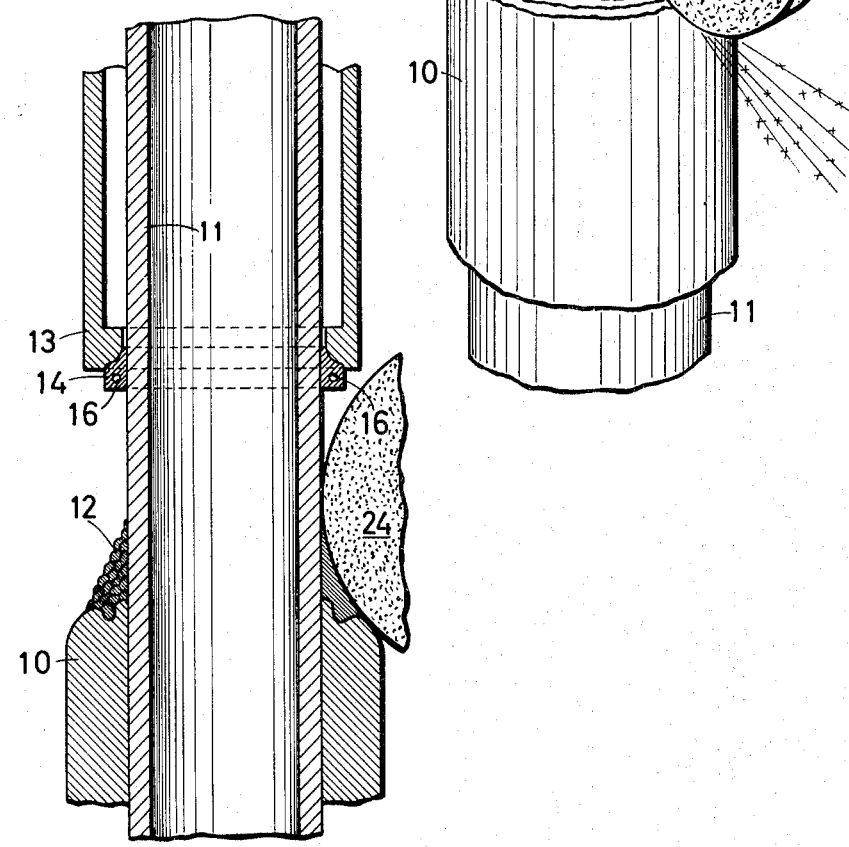

A driving means 18 is mounted upon the carrier by means of a staple 19 provided with adjusting screws 20 and 21, the arrangement being such that the position of the driving means may be adjusted in the axial direction as well as in the radial direction with respect to the longitudinal axis of the tubes. To this end, screw 21 rotates freely in the right hand block attached to motor 18 so as to move the motor toward or away from the threaded horizontal extension on staple 19. Similarly, screw 20 is rotated in the threaded lateral extension on staple 19 but is freely rotatable in a block secured to the motor, thereby providing vertical displacement of motor 18 in staple 19. The driving means is on this occasion an air motor, which is supplied with compressed air through a conduit 22. The motor drives a grinding wheel, which is mounted on an arm 23, and the arrangement is such that the grinding wheel depending upon the positioning of the lower guiding ring 14 will be located in such a manner in relation to the welding seam that it, in the manner indicated at the right part of FIG. 2, will grind the full external face of the joint without reaching the inner tube.

The complete device is as above mentioned rotated around the tube by means of the hand wheel in step with the grinding, and by means of screws 20 and 21 the position of the grinding wheel may be adjusted as it is worn down during the work.

What we claim is:

1. An improved means for grinding the surface of a welding seam interconnecting two tubular members, of which one tubular member is fitted within a heavier outer tubular member and connected to the latter by means of an external welding seam which covers at least a substantial part of the end of the heavier outer tubular member and conically tapers towards the inner tubular member, which comprises, in combination, a guiding ring detachably mountable on such inner tubular member;

a rotatable carrier resting on the guiding ring and concentrically arranged with respect to such tubular members;

means for rotating said carrier on said guiding ring;

a grinding wheel;

means adjustably mounted upon the carrier for driving a grinding wheel including a driving arm extending from said driving means and rotatably carrying said grinding wheel tangentially with respect to said inner tubular member; said driving arm being arranged in a manner to bring said grinding wheel in a position to work the full external face of the welding seam without contacting said inner tubular member; and further means for adjusting the position of the driving means and thereby also the grinding wheel both axially and radially with respect to the longitudinal axis of the tubular members.

* * * * *